(12) United States Patent
Kanda

(10) Patent No.: US 6,507,708 B2
(45) Date of Patent: Jan. 14, 2003

(54) CAMERA-TYPE IMAGE INPUT APPARATUS

(75) Inventor: Masao Kanda, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/919,923

(22) Filed: Aug. 2, 2001

(65) Prior Publication Data

US 2002/0025159 A1 Feb. 28, 2002

(30) Foreign Application Priority Data

Aug. 31, 2000 (JP) ......................................... 2000-262956

(51) Int. Cl.$^7$ .......................... G03B 13/16; G03B 7/099
(52) U.S. Cl. ...................... 396/109; 396/270; 396/431
(58) Field of Search ................................ 396/106, 109, 396/111, 118, 147, 270, 431; 355/44, 45, 61, 62, 70; 348/345, 335, 346, 370, 207

(56) References Cited

U.S. PATENT DOCUMENTS 3,471,704 A * 10/1969 Koch ......................... 396/270

5,319,182 A 6/1994 Havens et al. .............. 235/462

FOREIGN PATENT DOCUMENTS

EP  1 022 608 A1  7/2000  .......... G03B/27/32

\* cited by examiner

*Primary Examiner*—W. B. Perkey
(74) *Attorney, Agent, or Firm*—Young & Thompson

(57) ABSTRACT

A camera-type image input apparatus comprises a light-receiving element disposed in a light-receiving area for receiving light from an object through a lens, and light-emitting elements disposed in the light-receiving area to irradiate the object through the lens. Since the light-emitting elements disposed in the light-receiving area irradiate the object through the lens to have an irradiation pattern formed on the object, a user can perform viewing and focusing based on such an irradiation pattern. Hence, viewing and focusing can be performed efficiently, and distortion-free pictures can be taken.

10 Claims, 11 Drawing Sheets

CAMERA-TYPE IMAGE INPUT APPARATUS

BACKGROUND OF THE INVENTION

1. Field of the Invention

The present invention relates to cameras capable of providing users with ease for viewing and focusing adjustment.

2. Description of Related Art

To photograph an object with a camera, a photographer must perform viewing and focusing to have the object sharply focused at a desired angle of view (the term "viewing" herein used is intended to mean setting an angle of view, i.e., selecting an image area). For these viewing and focusing operations, the following techniques are known in the art. One technique is to use a viewfinder for cameras with a viewfinder mechanism, as shown in FIG. 11, for example. Another technique is to use a focusing glass frame (i.e., a ground glass disposed on the image-formation plane) for large-format cameras (using 4×5 or larger films) having no viewfinder mechanism. Still another technique is to directly capture images of the object.

By the way, when the photographer takes a picture of a high-rise building from a low position in a manner looking up at the building, the higher parts of the building look narrower in the picture. This is due to distortions derived from a lens or lenses through which nearby objects turn out to be large and distant objects small in respect to their relative distance and positions. In order to compensate for these distortions, a tilt/shift mechanism is available. With this mechanism, buildings, etc. can be pictured upright with such distortions corrected.

However, use of the viewfinder for viewing and focusing requires mirror raising control during capturing of images, thus resulting in inefficiency, while use of the focusing glass frame entails time and labor since the user must detach a photoelectric converting section, and then attach the focusing glass frame, thus resulting likewise in inefficiency. The technique of directly capturing images of the object involves much time in capturing the images and is hence inefficient. Especially when a one-dimensional sensor is used as a sensor for scanning the images, such a sensor consumes much time in making scanning movements.

Further, common to all the techniques known in the art is the fact that it is only the photographer looking into the camera that can perform viewing and focusing. Thus, to adjust the position of an object, for example, the photographer, who is tied down to looking into the camera, has to instruct his/her crew members to do so, which is cumbersome.

Still further, to handle the camera with the tilt/shift mechanism, the user must be skillful in performing operations such as rise, fall, shift, tilt, and swing. Thus, novice photographers have difficulty operating this mechanism in order to take distortion-free pictures.

SUMMARY OF THE INVENTION

The present invention has been made in view of the above circumstances, and an object thereof is to provide a camera-type image input apparatus that allows users to execute efficient viewing and focusing and to take pictures free of distortion.

According to the apparatus of the invention, the light-emitting elements disposed in the light-receiving area irradiate an object through the lens to form an irradiation pattern, and hence viewing and focusing can be performed based on the irradiation pattern.

According to the apparatus of the invention, to receive the light from the object through the lens, the light-receiving element is set in the light-receiving area, while to irradiate the object through the lens, the light-emitting elements are set in the light-receiving area. Therefore, accuracy can be improved when viewing and focusing adjustments are made based on the irradiation pattern formed on the side of the object by the light-emitting elements.

Therefore, the mechanism can be realized easily, which switches between the light-receiving element and the light-emitting elements.

The mechanism can be downsized, which switches between the light-receiving element and the light-emitting elements.

Therefore, two-dimensional images can be captured by the one-dimensional sensor.

Accuracy can be improved when viewing and focusing adjustments are made based on the irradiation pattern formed on the side of the object by the light-emitting elements.

When such a light-receiving device is attached to a commercially available large-format camera in place of its film back, the large-format camera can function similarly to the camera-type image input apparatus described first of the present invention.

When such a light-receiving device is attached to a commercially available large-format camera in place of its film back, the large-format camera can function similarly to the camera-type image input apparatus described second of the present invention.

DETAILED DESCRIPTION OF THE PREFERRED EMBODIMENTS

The present invention will now be described with reference to the drawings showing preferred embodiments thereof.

Figure 1:
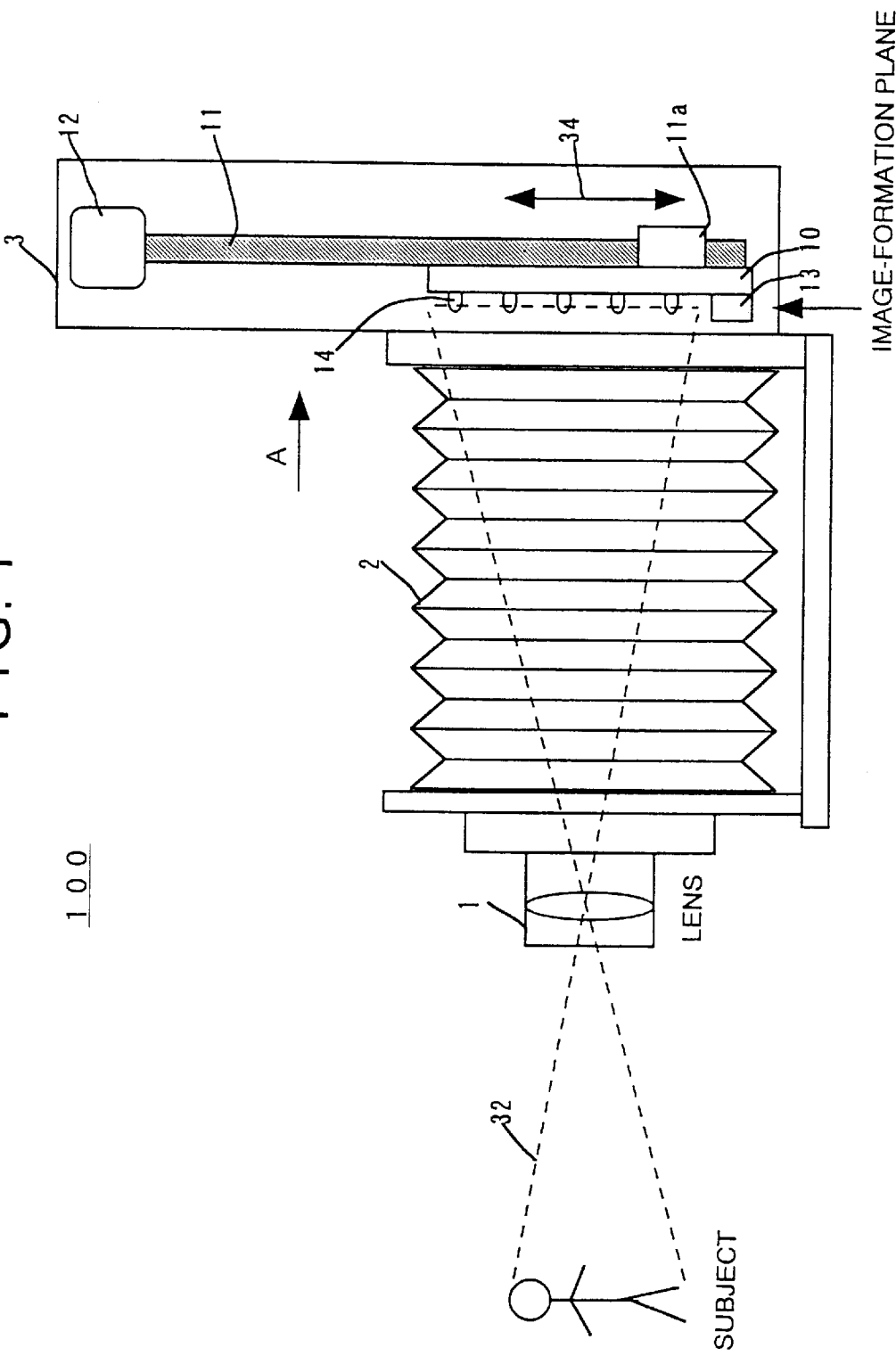
FIG. 1 is a view schematically showing the entire configuration of a camera-type image input apparatus according to the present invention.
Figure 2:
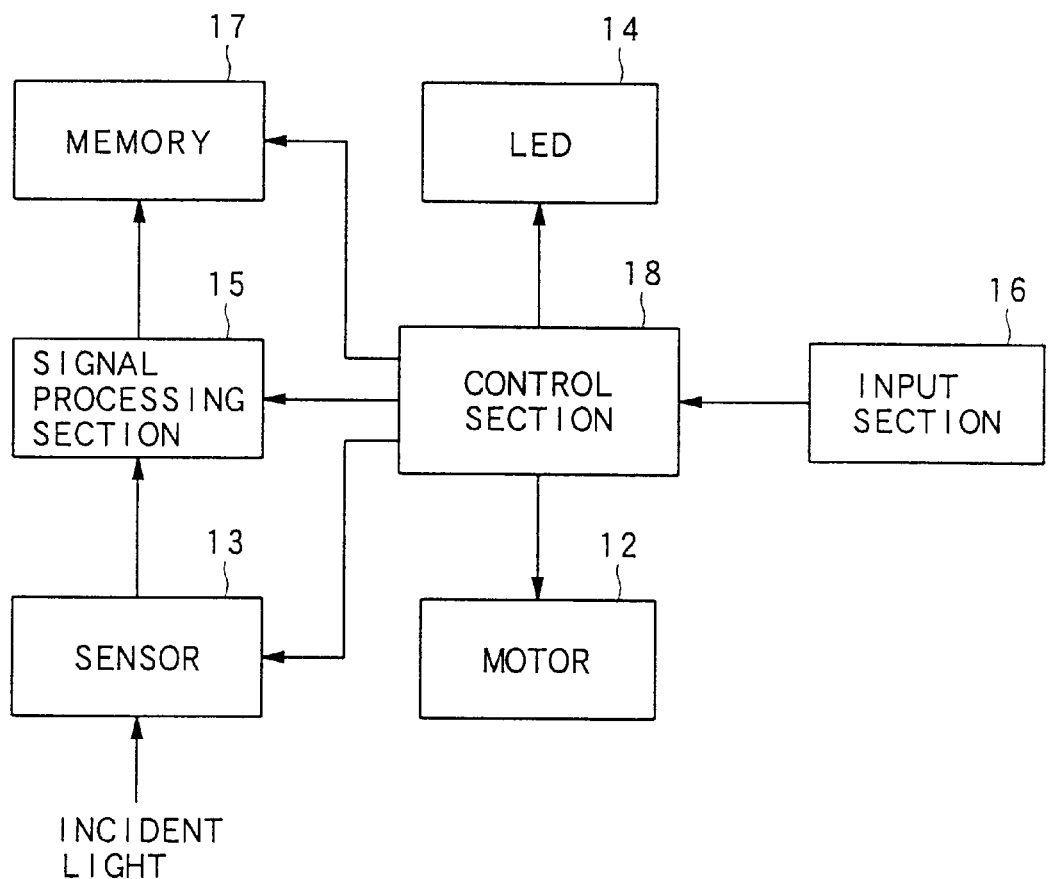
FIG. 2 is a view schematically showing block diagram blocks of an image-formation section, which is a characteristic feature of the invention.

FIG. 1 is a view schematically showing the entire configuration of a camera-type image input apparatus 100 according to the invention. As shown in the figure, the apparatus 100 is comprised of a lens section 1, a body section 2, and an image-formation section (light-receiving section) 3. The lens section 1 and the image-formation section 3 are detachable from the body section 2. The image-formation section 3, which is a characteristic feature of the invention, can be attached to the film back of a commercially available large-format camera as a light-receiving module to provide such camera with functions equivalent to those of the camera-type image input apparatus 100 of the invention. FIG. 2 is a view schematically showing block diagram of this image-formation section 3.

Incident light 32 from an object forms an image on an image-formation plane (light-receiving plane) of the image-formation section 3 via a lens of the lens section 1. The image formed in a two-dimensional image area on the image-formation plane is converted into an electrical signal by a sensor 13 that is a light-receiving element. This signal is then processed by a signal processing section 15 for filtering noise, making various compensations, etc., and thereafter stored in a memory 17. The sensor 13, which is implemented by a solid-state imaging device such as a CCD imaging device or a MOS imaging device, includes a monochromatic image detecting element and a color image detecting element with a color filter.

The sensor 13 according to this embodiment is a one-dimensional, i.e., line sensor mounted on a movable board 10, as shown in FIG. 1. The movable board 10 is attached to a nut 11a meshed with a ball screw 11. As the ball screw 11 turns while driven by a motor 12 during photographing, the movable board 10 moves vertically (in both directions 34 shown in FIG. 1) inside the image-formation section 3. The motor (e.g., a stepping motor) 12 is controlled to drive by a controller 18. The controller 18, which is comprised mainly of a microcomputer, performs control over the driving of the motor 12, the turning on/off of LEDs 14, etc. Connected to an input section 16 are switches, such as a pointer switch for turning on/off the LEDs 14, an imaging start switch, and an origin detecting switch, for example.

Figure 3:
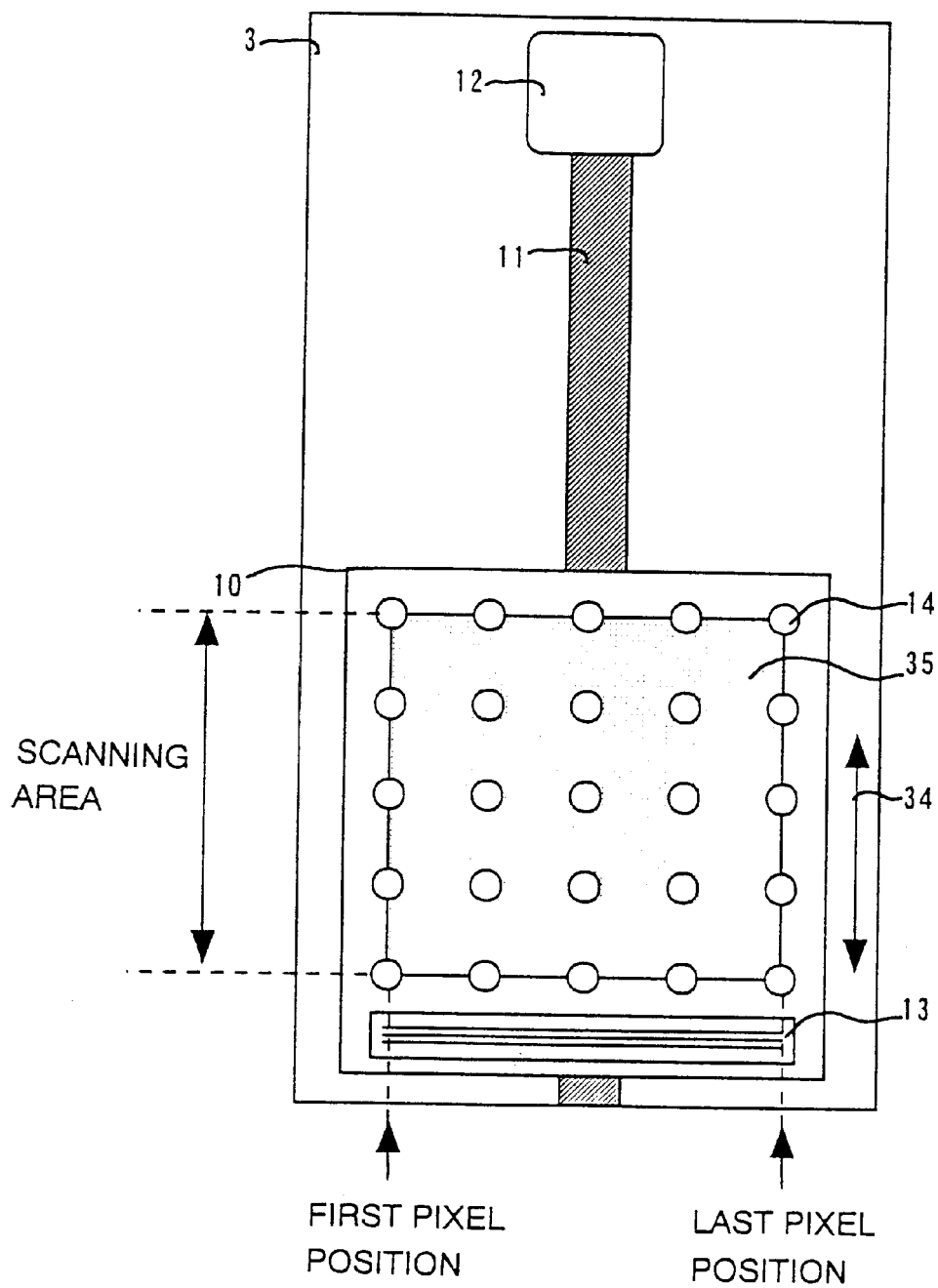
FIG. 3 is a view showing the internal structure of the image-formation section as viewed in a direction A of FIG. 1.

FIG. 3 is a view showing an example of the internal structure of the image-formation section 3 as viewed in the direction A of FIG. 1. Although the movable board 10 shown in FIG. 3 is rectangular in configuration, it may be circular, or take other form as well. In addition to the sensor 13, the movable board 10 has a plurality of LEDs 14 arranged thereon two-dimensionally. Although FIG. 3 shows a configuration of 5×5 equidistantly arranged LEDs 14, their number may be increased or decreased. When the movable board 10 is set in a pre-imaging normal position (hereinafter referred to as the "pointer position"), an area 35 including the LEDs 14 corresponds to the image area. In the example of FIG. 3, peripheral LEDs 14, i.e., the LEDs 14 located along the four sides defining the area 35 are arranged such that their light-emitting sections align with the four sides defining the image area, i.e., a scanning area of the sensor 13 defined by the first and last pixel positions widthwise. These peripheral light-emitting sections of LEDs may be located inside or outside such a scanning area. The position of the movable board 10 is detected by the microcomputer of the controller 18. The microcomputer measures the rotational angle of the motor 12, for example. Measurement of such a rotational angle makes it possible to detect the position of the movable board 10. There is also provided the origin detecting switch (not shown) in a prescribed position inside the image-formation section 3 so as to detect the origin of the movable board 10, whereby the position of the movable board 10 can be adjusted based on a signal from this origin detecting switch, upon start of the microcomputer, for example.

The LEDs 14 irradiate the object through the lens of the lens section 1. That is, rays of light from the LEDs 14 are projected onto the object to form their images on the side of the object. If, for example, a line sensor with a resolution of 10600 pixels is used as the sensor 13 for scanning a scanning area of 10600 pixels, the 5×5 LEDs 14 arranged as shown in FIG. 3 irradiate a photographing area (i.e., the object) consisting of 10600×10600 pixels, whereby the user can perform viewing and focusing from outside without having to look into the camera. During imaging, the area 35 defined by the LEDs 14 on the movable board 10 moves along with the movement of the movable board 10 driven by the motor. The sensor 13, which is also mounted on the movable board 10 also moves on the image area. An image of the object formed in the two-dimensional image area on its image-formation plane is scanned by means of the sensor 13. If the one-dimensional and line sensor 13 having a resolution of 10600 pixels is used and moved by a distance corresponding to 10600 lines to carry out a scanning process, an image consisting of 112,360,000 pixels can be captured.

As described above, during viewing and focusing before imaging, the LEDs 14 are placed on the image area, whereas during imaging, the sensor 13 is placed on the image area. That is, the LEDs 14 and the sensor 13 are switchable on the image area.

If an exposure meter is disposed at an arbitrary point on the movable board 10, the brightness of the object or the intensity of the light from the object can be measured.

Figure 4:
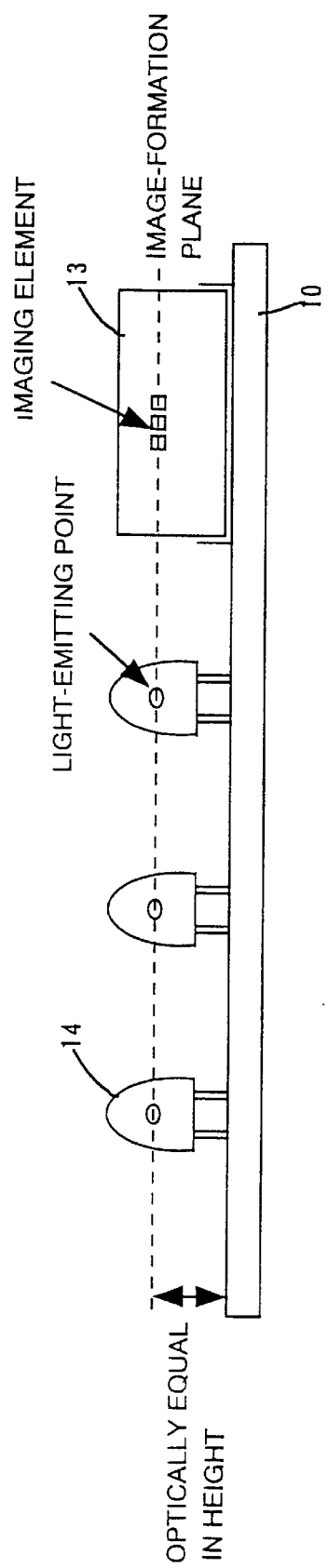
FIG. 4 is a side view of a movable board 10, which illustrates the height relationship between a sensor and light-emitting diodes (LEDs)

FIG. 4 is a side view of the movable board 10, which illustrates the height (positional) relationship between the sensor 13 and the LEDs 14. In an example shown in FIG. 4, the image-formation plane (light-receiving plane) of the sensor 13 is optically identical in height (position) to the light-emitting points of the LEDs 14. This is to prevent the sensor 13 and the LEDs 14 from being out of focus due to their structural aspects. That is, in FIG. 4, the sensor 13 includes a protecting member such as a sheet of glass provided in front of its imaging element. The LED 14 has its light-emitting point (light-emitting element) sealed in a protecting member made of, e.g., transparent resin. In view of the fact that the configuration and refractive index of these protecting members exert influence on the focal distance of the optical system of the camera as a whole, both the sensor 13 and the LEDs 14 must be arranged such that their heights from the movable board 10 cancel out such influence.

In FIG. 4, this height setting for the sensor 13 and the LEDs 14 results from the assumption that each LED 14 includes a protecting member made of transparent resin and that its light-emitting body irradiating the object to form an image on the object for focusing is the surface of a diode junction. If, on the other hand, each LED 14 has a protecting member made of translucent resin, and if its light-emitting point is the surface of its light-emitting element, i.e., if such surface itself, having, e.g., a graphic image depicted thereon, irradiates the object to form the graphic image on the object, then the height setting must be adjusted accordingly in consideration of these factors.

At any rate, it is important in the height setting that an image of the object be formed on the image area while focused on the imaging element, upon switching from the LEDs 14 to the sensor 13 with rays of light from the light-emitting points of the LEDs 14 being focused on the object.

Figure 5:
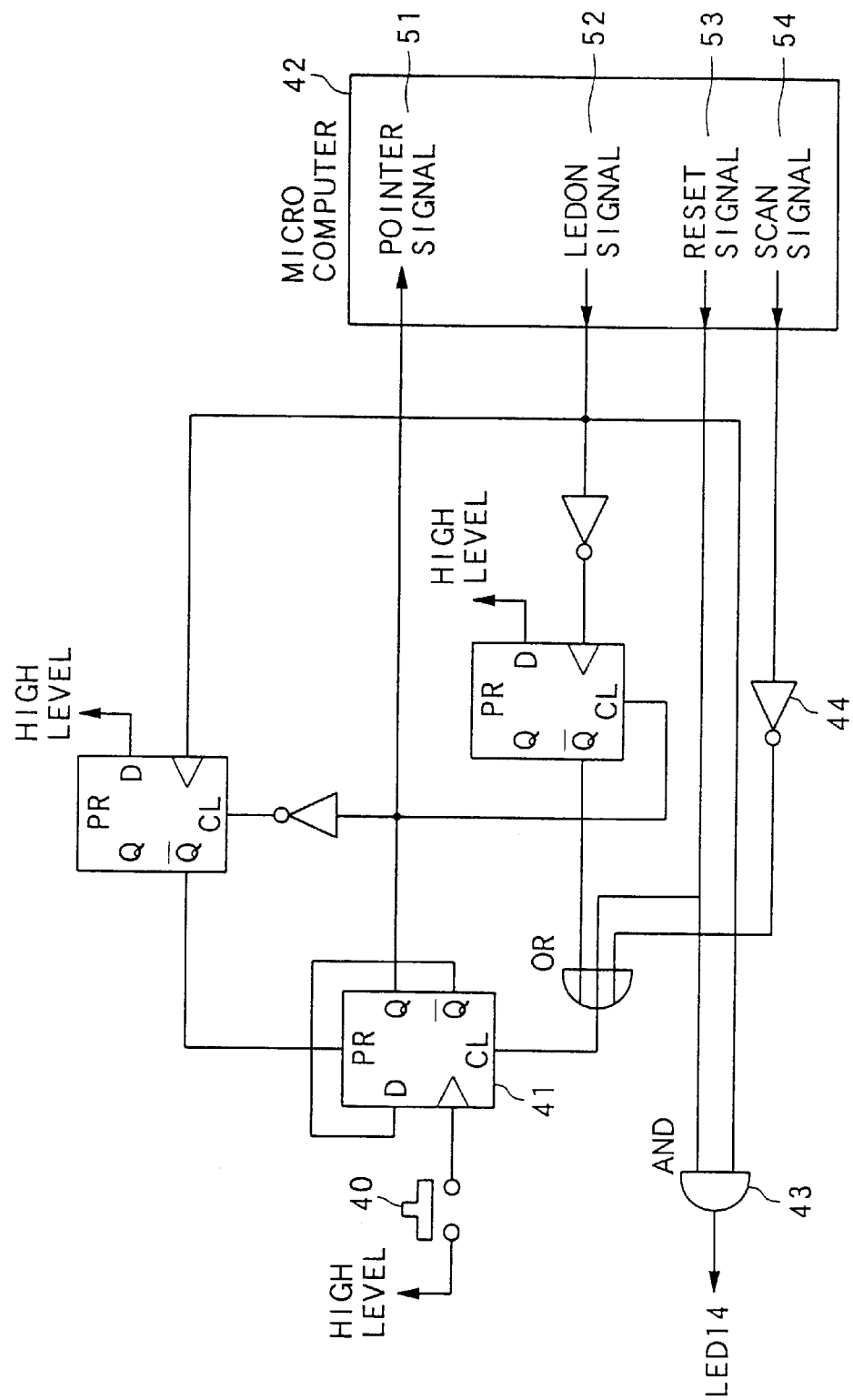
FIG. 5 is a view showing an example of a control circuit within a controller for controlling the turning on/off of the LEDs.
Figure 6:
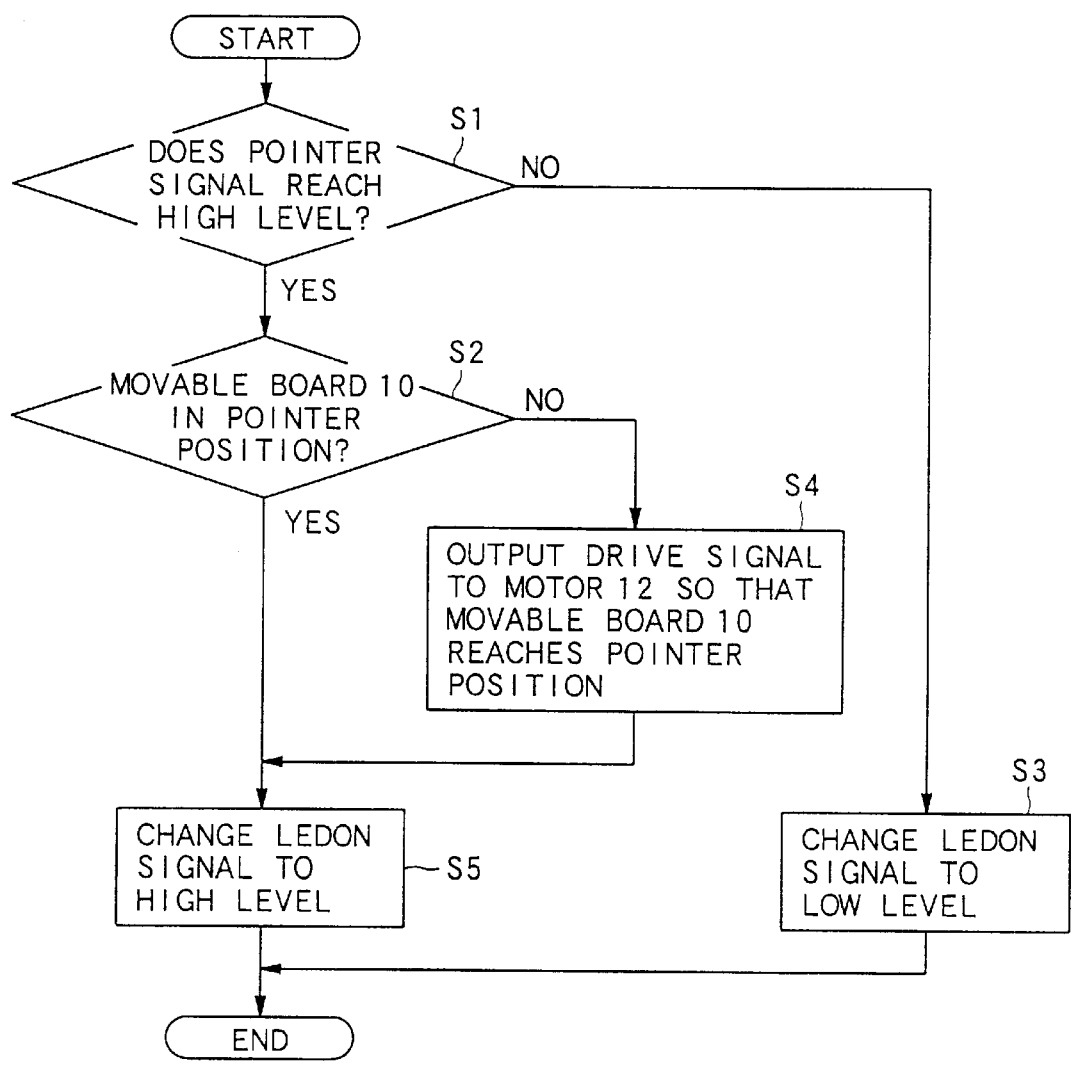
FIG. 6 is a diagram showing an example of a flow of control according to which a microcomputer of the controller turns on/off the LEDs.

FIG. 5 shows an example of a control circuit incorporated in the controller 18 that controls the turning on/off of the LEDs 14, and FIG. 6 shows an exemplary flow of control over the turning on/off of the LEDs 14 executed by a microcomputer 42 of the controller 18. In the example of FIG. 5, a toggle switch is used as a pointer switch 40. When the pointer switch 40 is turned on, a Q output of a D flip-flop 41 goes high to be input to the microcomputer 42 as an high-level pointer signal 51. Responsive thereto, the microcomputer 42 determines, as shown in FIG. 6, whether the pointer signal 51 is high or low (Step S1). When the answer at Step S1 is "Yes," the microcomputer 42 goes to Step S2. When the answer is "No," it outputs an LEDON signal 52 after causing it to go low (Step S3).

At Step S2, the microcomputer 42 determines whether or not the movable board 10 is in the pointer position. For such determination, the microcomputer 42 utilized the rotational angle of the motor 12 to detect the position of the movable board 10. Upon determination that the movable board 10 is in the pointer position, the microcomputer 42 outputs an LEDON signal 52 after causing it to go high (Step S5). On the other hand, if the movable board 10 is determined to be out of the pointer position, the microcomputer 42 inputs a drive signal to the motor 12 so as to bring the movable board 10 to the pointer position (Step S4), and then outputs an LEDON signal 52 after causing the signal to go high (Step S5). This high-level LEDON signal 52 is fed to the LEDs 14 through an AND circuit 43 shown in FIG. 5, whereby the LEDs 14 are lit. The LEDs 14 turn off when the pointer switch 40 is turned off, since the turning off of the switch 40 forces the pointer signal 51 low.

Further, even when the pointer switch 40 is "on," output of a low-level reset signal 53 or a high-level scan signal 54 (which is then inverted by a NOT circuit 44) from the microcomputer 42 causes an L-level signal to be input to a CL input of the D flip-flop 41, thereby pulling the pointer signal 51 low, and hence forcibly turning the LEDs 14 off. The reset signal 53 goes low at the initialization of the microcomputer (when its power is turned on). Further, the scan signal 54 goes high during imaging, i.e., the sensor 13 is scanning an image in the image area.

Another embodiment will be described next, in which a photographer takes a picture of an object using the camera-type image input apparatus 100.

Figure 7:
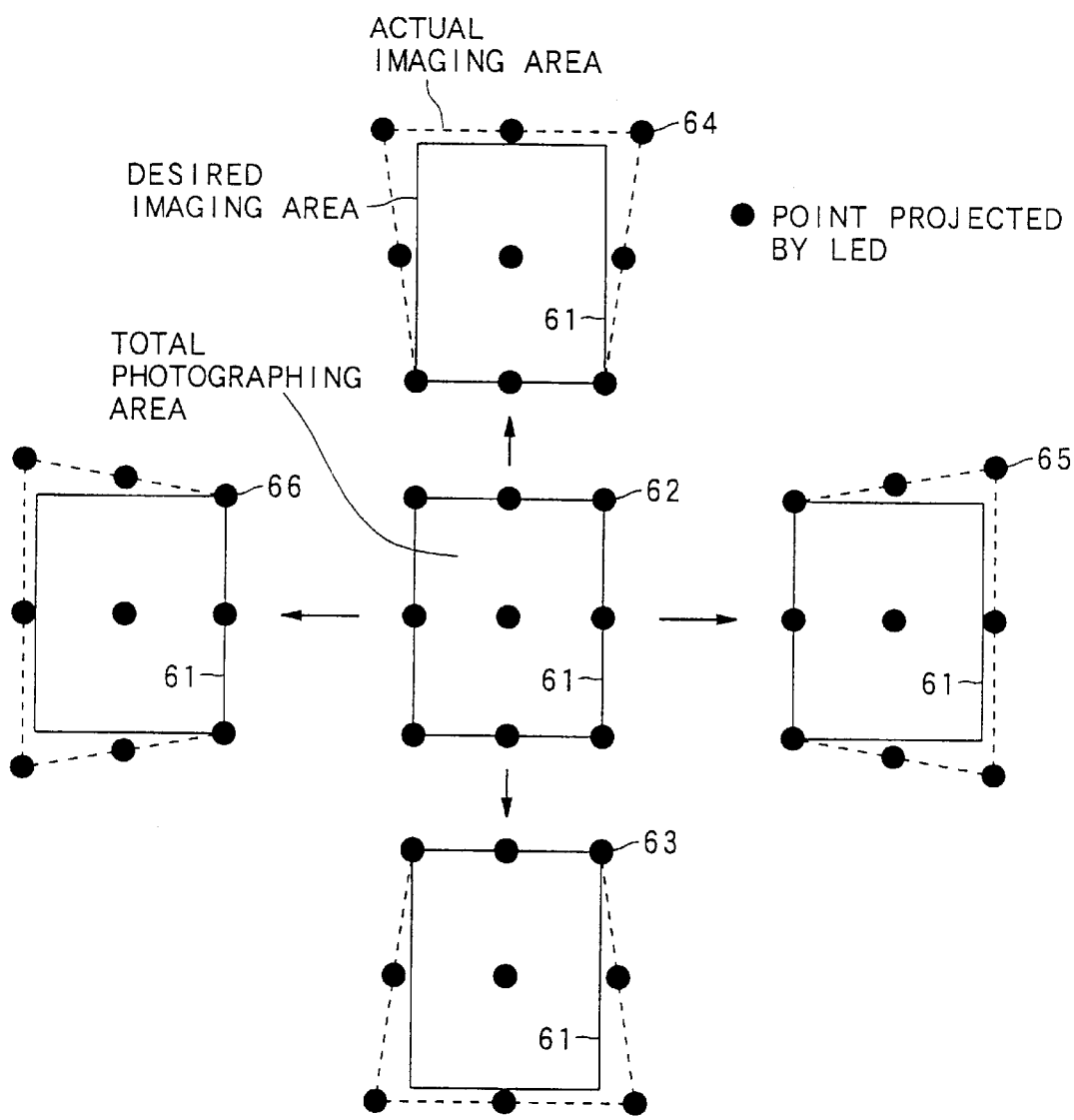
FIG. 7 is a view showing examples of irradiation patterns formed on the side of an object by the LEDs.

When the photographer sets the camera-type image input apparatus 100 toward the object, and powers the apparatus 100 to turn the pointer switch 40 on, the microcomputer 42 of the controller 18 executes the control process mentioned above with reference to FIG. 6. As a result, the plurality of LEDs 14 are lit to irradiate the object through the lens, forming an irradiation pattern on the object. FIG. 7 shows examples of such irradiation patterns formed by the LEDs 14 on the side of a planar object 61 (the object 61 being surrounded by the solid line in each example). An irradiation pattern 62 of FIG. 7 is rectangular (as surrounded by the points excluding the central one projected by the LEDs), and such a rectangular configuration matches with the configuration. of an image area in which the photographer desires the object 61 to be imaged. Under this condition, the camera-type image input apparatus 100 is arranged such that its optical axis aligns with a perpendicular penetrating through the center of the desired image area (i.e., the apparatus 100 is positioned squarely face to face with the object). When the apparatus 100 is positioned as such, the plane on which the object 61 forms its image coincides with the image-formation plane of the image-formation section 3 (i.e., the plane which the light-receiving element of the sensor 13 scans), whereby the image in the desired image area can be photographed without distortion, with the light rays from all the LEDs sharply focused on the object.

On the other hand, an irradiation pattern 63 of FIG. 7 is trapezoidal, not matching with the desired image area. This mismatch amounts to the fact that the object 61 is deviated downward from the face-to-face position, with the plane of the object 61 not being parallel to the image-formation plane of the image-formation section 3. When the photographer tries to image the object 61 according to this pattern 63, the upper side of the desired image area becomes longer than the lower side (i.e., the object 61 is imaged on the image-formation plane of the sensor in the form of a trapezoid obtained by turning the pattern 63 upside down). Since the distance between the camera-type image input apparatus 100 and the points projected by the LEDs is different in the top, middle, and bottom rows of the pattern 63, when light rays from the LEDs in the middle row are focused on the object 61, for example, those points projected by the LEDs in the top and bottom rows become out of focus. Similarly, other irradiation patterns 64, 65, and 66 also deviate in the directions indicated by the arrows.

Thus, when finding any irradiation pattern other than the pattern 62, the photographer can make viewing and focusing adjustments to obtain the pattern 62, while observing the current irradiation pattern of the LEDs. The color of some of the LEDs 14 may be different from the rest to facilitate these adjustments. If the color of the LED 14 at the center is different from the rest, for example, the photographer can locate the center on the side of the object more clearly, paying attention to such differently colored point in the pattern. If the LEDs 14 at the four corners are colored differently from the other LEDs 14, the photographer can define the image area on the side of the object more clearly, checking the thus highlighted pattern.

Then, when the photographer has obtained the desired pattern by proper adjustment and presses the imaging start switch, the microcomputer 42 of the controller 18 outputs the previously mentioned scan signal 54 to turn off the LEDs 14, and also outputs the drive signal to the motor 12 to activate the motor 12. The driving of the motor 12 causes the movable board 10 to move upward so that the sensor 13 starts to scan an image of the object 61. The scanned image is then stored in the memory 17 through the signal processing section 15.

According to the camera-type image input apparatus 100 of the invention, the photographer can not only perform, but also adjust and confirm viewing and focusing while observing patterns projected on a object by the irradiation of the LEDs. In addition, the apparatus 100 allows crew members other than the photographer to perform viewing and focusing, thus no longer requiring the photographer to give instructions to his/her crew members to adjust the position of the object, for example. Further, viewing and focusing adjustments can be made without attaching/detaching the photoelectric converting section, unlike the conventional cameras. Still further, even novice photographers can take distortion-free pictures in a simple way without performing operations with the use of the tilt/shift mechanism, such as rise, shift, and tilt, which require skill. The apparatus 100 not requiring images to be captured for viewing and focusing also contributes to efficient picture taking. Even when the user intentionally performs operation with the use of the tilt/shift mechanism, the apparatus 100 can, of course, provide him/her with ease for viewing and focusing adjustment.

Figure 8:
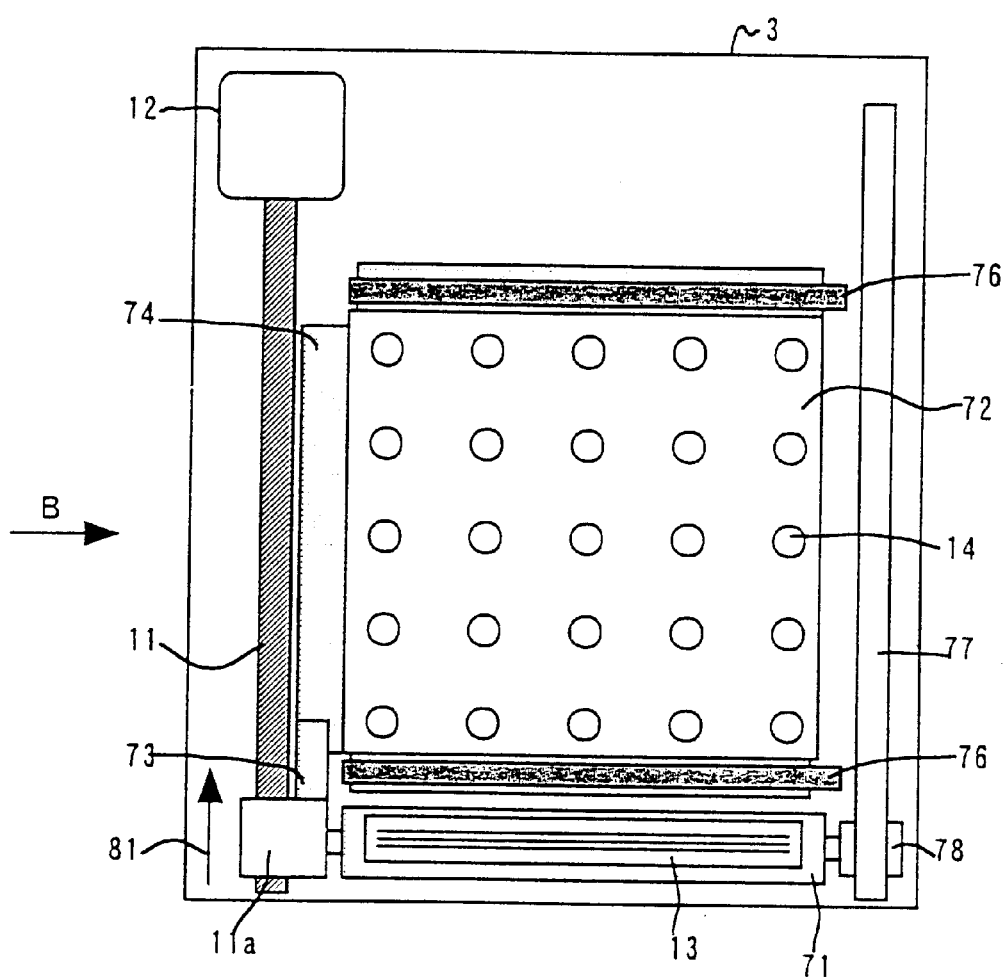
FIG. 8 is a view showing the internal structure of the image-formation section when the sensor and the LEDs are disposed on separate movable boards.
Figure 9A:
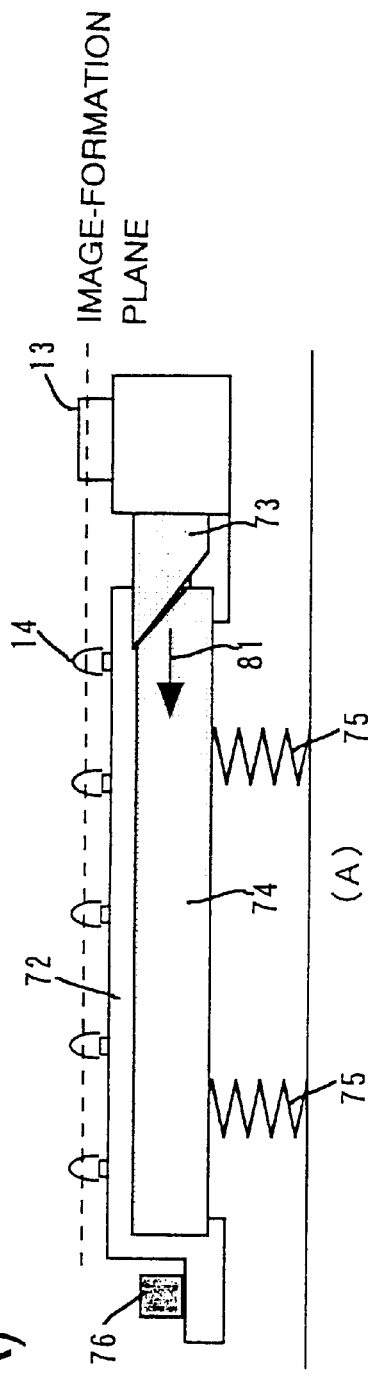
FIGS. 9A and 9B are views each showing the internal structure of the image-formation section as viewed in a direction B of FIG. 8 (i.e., from a side)
Figure 9B:
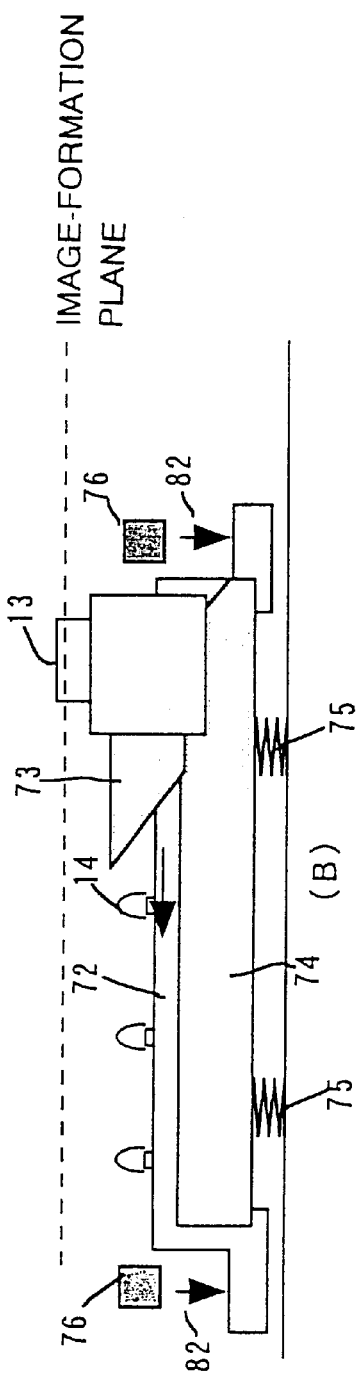

While the sensor 13 and the LEDs 14 are mounted on the single movable board 10 of the image-formation section 3 in the above-described embodiments, the sensor 13 and the LEDs 14 may be mounted on separate movable boards, respectively, thereby to move the boards independently of each other. FIG. 8 is a view showing an example of the internal structure of the image-formation section 3, in which the sensor 13 and the LEDs 14 are mounted on separate movable boards, respectively, whereas FIGS. 9A and 9B are views showing the same structure as viewed in the direction B (i.e., from a side) of FIG. 8 (the ball screw 11 and the nut member 11a are, however, omitted). As shown in FIG. 8, a movable board 71 having the sensor 13 is separate from a movable board 72 having the LEDs 14. The board 71 is fixed at one end thereof to the nut member 11a engaged with the ball screw 11, and at the other end thereof to a ball bush (linear bearing) 78 into which a guide rod 77 is fitted. Further, as shown in FIGS. 9A and 9B, the image-formation plane of the sensor 13 is optically identical in height to the light-emitting points of the LEDs 14, similarly to FIG. 4.

When the ball screw 11 rotates as driven by the motor 12, the movable board 71 carrying the sensor 13 moves in the direction pointed by the arrow 81. As the movable board 71 so moves, a member 74 provided on the movable board 72 is pushed down by a member 73 that moves together with the movable board 71, whereby the movable board 72 moves in the direction pointed by the arrow 82, as shown in FIG. 9B. The member 73 may be a cam follower. As a result, the sensor 13 moves over the LED-mounted movable board 72, scanning an image of a object in the image area. Upon end of the scanning by the sensor 13, the movable board 71 returns to its original position (i.e., the pointer position), and then the movable board 72 is pushed up by springs 75 until stopped at its original position by stoppers 76. During this movement, the movable board 71 makes parallel movement while guided by an appropriate guide member, not shown, to have its position regulated relative to the image-formation plane. With this arrangement, the image-formation section 3 can be smaller than the embodiment shown in FIG. 3 in terms of the height of the camera-type image input apparatus 100. If the apparatus 100 requires no focus adjustment, the movable board 72 may be stationarily placed at such evacuated position as pushed down in the direction of the arrow 82 in FIG. 9B in advance. This arrangement enables the user to perform viewing without a mechanism for moving the movable board 72.

Figure 10:
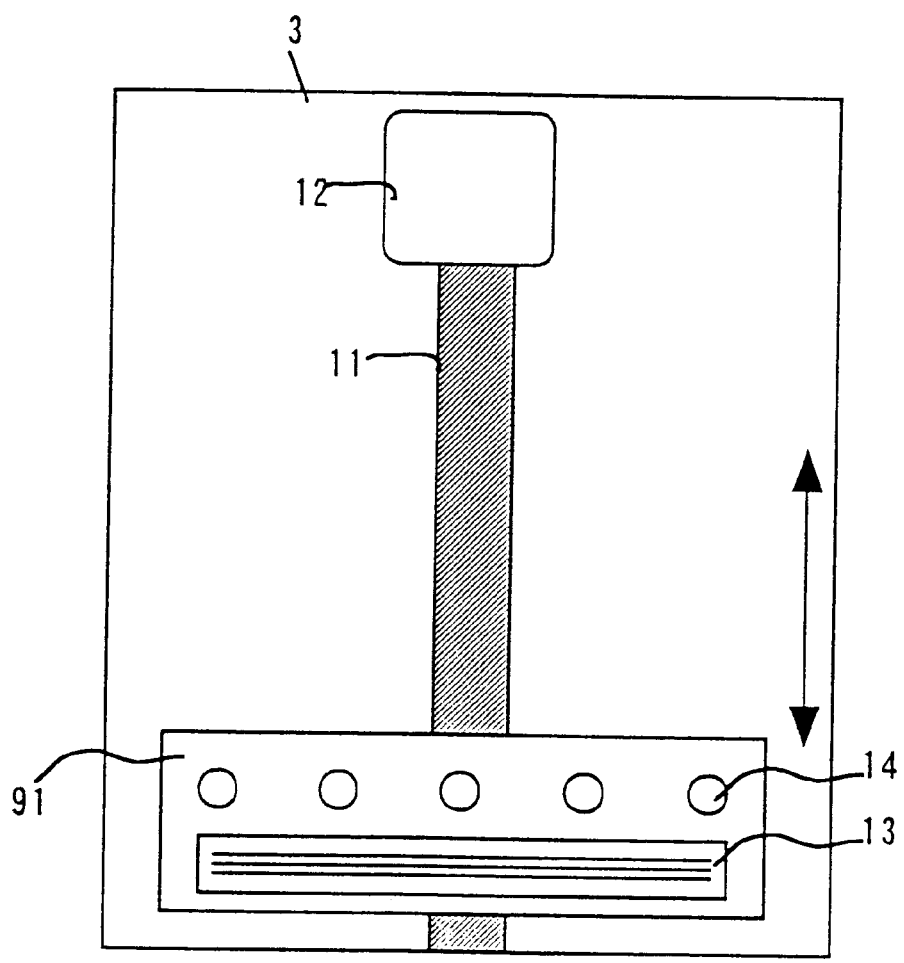
FIG. 10 is a view showing the internal structure of the image-formation section when the LEDs are disposed on a movable board one-dimensionally.
Figure 11:
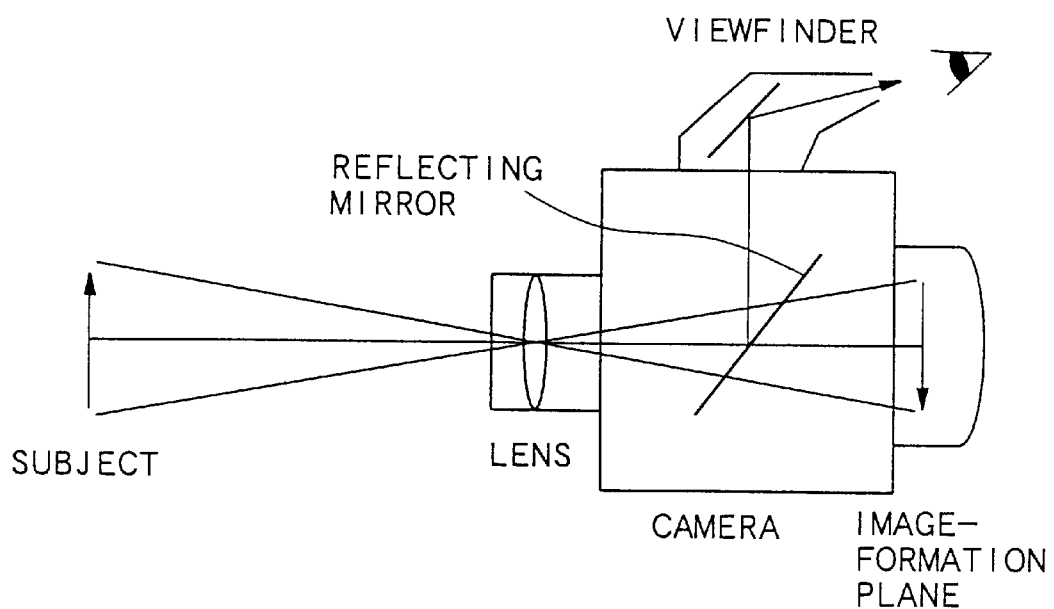
FIG. 11 is a view showing an example in which a viewfinder is used for viewing and focusing.

Further, while the LEDs 14 are arranged two-dimensionally in a rectangular array on the movable board 10 of the image-formation section 3 in the above-described embodiments, the number of rows may be decreased in the direction of movement of the movable board 10, e.g., as shown in FIG. 10, wherein the LEDs 14 are arranged one-dimensionally. In this example, a movable board 91 is reciprocated to have light rays from the linearly arranged LEDs 14 projected on the side of an object two-dimensionally for viewing and focusing. This arrangement contributes to further downsizing the image-formation section 3.

Still further, while a one-dimensional sensor is used as the sensor 13 in the above-described embodiments, a two-dimensional sensor may be used. In such a case, advantages similar to the above can be obtained without scanning to capture images.

The entire disclosure of Japanese Patent Application No. 2000-262956 filed on Aug. 31, 2000 including the specification, claims, drawings and summary is incorporated herein by reference in its entirety.

What is claimed is:

1. A camera-type image input apparatus comprising a control section for controlling switching between a light-receiving element for receiving light from an object through a lens and light-emitting elements for irradiating said object through said lens, in a light-receiving area for receiving said light from said object through said lens, said light-receiving element and said light-emitting elements being disposed on a single movable member, and wherein said control section moves said movable member to switch between said light-receiving element and said light-emitting elements.

2. The camera-type image input apparatus according to claim 1, wherein said light-receiving element is a one-dimensional sensor, and receives the light from said object while being moved over said light-receiving area by said control section.

3. The camera-type image input apparatus according to claim 2, wherein a position of a light-receiving plane of said light-receiving element located in said light-receiving area is optically identical to a position of a light-emitting point of each of said light-emitting elements located in said light-receiving area.

4. The camera-type image input apparatus according to claim 1, wherein a position of a light-receiving plane of said light-receiving element located in said light-receiving area is optically identical to a position of a light-emitting point of each of said light-emitting elements located in said light-receiving area.

5. A camera-type image input apparatus comprising a control section for controlling switching between a light-receiving element for receiving light from an object through a lens and light-emitting elements for irradiating said object through said lens, in a light-receiving area for receiving said light from said object through said lens, said light-receiving element and said light-emitting elements being disposed on separate movable members, respectively, and wherein said control section moves said separate movable members to switch between said light-receiving element and said light-emitting elements.

6. The camera-type image input apparatus according to claim 5, wherein said light-receiving element is a one-dimensional sensor, and receives the light from said object while being moved over said light-receiving area by said control section.

7. The camera-type image input apparatus according to claim 6, wherein a position of a light-receiving plane of said light-receiving element located in said light-receiving area is optically identical to a position of a light-emitting point of each of said light-emitting elements located in said light-receiving area.

8. The camera-type image input apparatus according to claim 5, wherein a position of a light-receiving plane of said light-receiving element located in said light-receiving area is optically identical to a position of a light-emitting point of each of said light-emitting elements located in said light-receiving area.

9. A light-receiving device for a camera-type image input apparatus, comprising a control section for controlling switching between a light-receiving element for receiving light from an object through a lens and light-emitting elements for irradiating said object through said lens, in a light-receiving area for receiving said light from said object through said lens, said light-receiving element and said light-emitting elements being disposed on a single movable member, and wherein said control section moves said movable member to switch between said light-receiving element and said light-emitting elements.

10. A light-receiving device for a camera-type image input apparatus, comprising a control section for controlling switching between a light-receiving element for receiving light from an object through a lens and light-emitting elements for irradiating said object through said lens, in a light-receiving area for receiving said light from said object through said lens, said light-receiving element and said light-emitting elements being disposed on separate movable members, respectively, and wherein said control section moves said separate movable members to switch between said light-receiving element and said light-emitting elements.

* * * * *